United States Patent
Kaartinen

(10) Patent No.: US 7,316,336 B2
(45) Date of Patent: Jan. 8, 2008

(54) QUANTITATIVE DOSING OF SMALL AMOUNTS OF LIQUIDS

(75) Inventor: Niilo Kaartinen, Kuusisto (FI)

(73) Assignee: Fluilogic Oy, Espoo (FI)

( * ) Notice: Subject to any disclaimer, the term of this patent is extended or adjusted under 35 U.S.C. 154(b) by 379 days.

(21) Appl. No.: 10/666,305

(22) Filed: Sep. 18, 2003

(65) Prior Publication Data

US 2004/0056048 A1 Mar. 25, 2004

(30) Foreign Application Priority Data

Mar. 26, 2001 (FI) .................................. 20010614
Mar. 21, 2002 (WO) ....................... PCT/FI02/00236

(51) Int. Cl.
*B65D 47/18* (2006.01)
(52) U.S. Cl. ....................... 222/420; 222/209; 417/44.2
(58) Field of Classification Search ................ 222/209, 222/340, 341, 361, 372, 407, 504, 420, 422, 222/214, 529, 530; 417/44.2, 45, 322
See application file for complete search history.

(56) References Cited

U.S. PATENT DOCUMENTS

| | | | | |
|---|---|---|---|---|
| 4,154,379 A | * | 5/1979 | Schermutzki | ................ 222/420 |
| 4,393,982 A | * | 7/1983 | Kuckens | ...................... 222/209 |
| 5,638,986 A | * | 6/1997 | Tuominen et al. | ............. 222/1 |
| 5,641,270 A | * | 6/1997 | Sgourakes et al. | ......... 417/44.2 |
| 6,623,257 B2 | * | 9/2003 | Taniguchi | ................... 417/478 |

FOREIGN PATENT DOCUMENTS

| | | |
|---|---|---|
| FI | 925025 | 11/1992 |
| FI | 964029 | 10/1996 |
| WO | WO 94/11710 | 5/1994 |
| WO | WO 97/01081 | 1/1997 |
| WO | WO 98/15800 | 4/1998 |

* cited by examiner

*Primary Examiner*—Lien M. Ngo
(74) *Attorney, Agent, or Firm*—Clifford G. Frayne

(57) ABSTRACT

The invention relates to quantitative dosing of small amounts of liquids having a volume of microliter or nanoliter order. Such a dosing technique is useful for instance for productive serial dosing in applications of clinical chemistry. In dosing device of the invention, flexible bellows (5) attached to a body (1) define a liquid space (15) filled with a liquid to be dosed and communicate with a dosing tip (19). The bellows (5) are provided with an actuator (7) for operation thereof, constricting the liquid space to cause a liquid dose to be discharged from the dosing tip. The invention is further directed to a dosing method based on movements of bellows moved by a magnetic actuator, and to a method wherein liquid is dosed as individual small droplets from the dosing tip by first accelerating and then by slowing down the motion of the bellows by means of the actuator.

21 Claims, 2 Drawing Sheets

QUANTITATIVE DOSING OF SMALL AMOUNTS OF LIQUIDS

BACKGROUND OF THE INVENTION

1. Field of the Invention

The invention relates to a dosing device for quantitative dosing of small amounts of liquids, comprising a body, a flexible bellows attached to the body defining a liquid space, a dosing tip communicating with the liquid space, and an actuator for moving the bellows to provide a constriction of the liquid space causing a liquid dose to be discharged from the dosing tip.

The invention further relates to methods for dosing small amounts of liquids quantitatively by means of flexible bellows moved by an actuator, and a dosing tip communicating with the bellows.

2. Description of the Prior Art

In conventional liquid dosing devices, a piston moving in a cylinder is used as the actuator to discharge a liquid dose. Main drawbacks of such dosing devices are the sliding friction between the cylinder and the piston and unpreciseness of the setting in motion and stopping of the piston, and as a consequence, reproducibility required in precise dosing of small liquid doses is not assured.

Published specification FI 94675 discloses a dispenser comprising a liquid space formed by flexible bellows actuated by an actuator. In this specification, the actuator is a stepping motor connected to the bellows through a gyrating shaft or a piezo rod or servo motor acting directly on the bellows. Substantial advantage of the described solution over a piston moving in a cylinder is the fact that the bellows may be moved without sliding friction in the mechanical parts. According to this publication, the bellows draw liquid through the dosing tip to the liquid space of the dispenser, and then, in the dosing step, a liquid dose is discharged from the dosing tip dipped into another liquid receiving said dose by moving the bellows in opposite direction.

In the dispenser described as an example in publication FI 94675, the volume change of the bellows produced in one step of the stepping motor serving as the actuator was about 10 µl. being theoretically the smallest liquid amount that may be dosed in this case. The stepping motor has a high number of step positions, and when dosing liquid volumes larger than said minimum volume, the motor is not able to pass direction from one step position to the other, but must pass through several successive steps with a defined velocity change in each step interval. This in turn limits the acceleration and slowing down of the dosing movement found to have a substantial role in dosing very small liquid doses according to the invention. This publication presents no description of dosing liquid amounts of nanoliter order, nor dosing droplets wherein liquid is discharged from the dosing tip into the air one droplet at a time.

A servo motor or a piezo rod acting as an actuator is not described in publication FI 94675 as fully as the stepping motor connected to the bellows through a shaft. However, the same limitations with respect to the acceleration of the movement apply both to the servo motor and to the stepping motor. Particularly, a drawback of the piezo rod is in turn the fact that a long piezo rod and high voltage source dangerous to the user are needed for the path of the bellows required in dosing a high number of liquid doses successively. In this case, the masses of the rod and moving auxiliary devices as well as the operation time thereof also become an obstruction to the sufficient acceleration of the movement.

Dosing liquid doses through the air from a dosing tip moved by bellows is known as such from FI104891. This document relates to serial dosing of liquid doses into packings by drawing liquid into the suction tip with bellows, followed by filling the packings one at a time by means of opposite dosing movements of the bellows. In contrast to FI94675, liquid is only present in the dosing tip whereas the bellows are filled with air. As stated in this publication, the preciseness attained with this technique is not too high, only about 1 percent, the volume of the doses to be dosed being from 5-500 µl according to said publication. Thus, said publication teaches no solution enabling the precision dosing of liquid amounts of nanoliter order.

In printers, it is known to use a technique using discharging an ink jet as droplets with the volume of picoliter order. The technique is however based on the fact that several successive droplets are focused on the same point, the size of individual droplets being not precisely controlled. The technique applied in printers is not a suitable solution to quantitative dosing of liquids.

The disadvantage of the prior art is thus the lack of a technique enabling the quantitative dosing of liquid amounts measuring only nanoliters. Such a technique is not known in dosing of liquids using a dosing tip to be contacted with the surface of the receiving liquid or dipped therein to discharge the dosed amount directly into said receiving liquid, not to mention in techniques for dosing liquids by discharging small droplets thereof into the air. The object of the invention is to find a solution eliminating said drawbacks. The invention particularly provides a new dosing technique suitable for the dosing needs in the fields of biochemistry, such as clinical and environmental chemistry.

OBJECTS OF THE INVENTION

According to the invention, the dosing device of the invention comprising bellows moved by an actuator and a dosing tip is characterized in that the actuator is formed of two parts moving relative to one another and acting magnetically on each other, one of the parts being connected to the body of the device and the other being connected to the flexible bellows, one of said parts being a current coil and the flexible movements of the bellows being produced by changing the magnitude of the electric current passing through the coil.

A characteristic feature of said actuator of the bellows formed of magnetic parts is the fact that electric current passing through the coil may be continuously controlled. This fact enables the precise adjustment of the selected length of the paths of the actuator and the bellows connected directly thereto without any transmitting means and consequently, the precise adjustment of the selected volume of the dosed liquid dose without the limitations due to the length of the step of the stepping motor used in prior art dosing means with bellows. Coils suitable for this purpose converting the magnetic field, altering by a changing electric current, into an attracting or repelling force acting on the bellows are known as such and commercially available for instance as sound coils for acoustic loudspeakers. Typically, the weight of the coil being some grams and the maximum repelling force being several kiloponds, the coil is able to produce small movements setting precisely with a very high acceleration for these parameters. The high-speed operation as such is an advantage when using the device for long serial dosing of hundreds of successive liquid doses, and it particularly enables the dosing of liquid from the dosing tip as small droplets into the air as described in more detail below in connection with the description of the dosing methods of the invention.

The actuator moving the bellows may be formed of a permanent magnet attached to the body of the device, and a current coil adjusted to the flexible end of the bellows. An opposite adjustment with the coil adjusted to be stationary and the permanent magnet moving relative thereto is also useful.

The dosing device of the invention may preferably be provided with a flexible centralizer following the movement of the end of the bellows to linearize the movements of the moving part of the actuator and the end of the bellows. Especially, long serial precise dosing of liquid in identical amounts requires in practice linear movement of the bellows, thus making the centralizer necessary in case the actuator itself will not control the direction of its movement. The centralizer may preferably be formed of three or more helical springs stationary connected at one end relative to the body of the device, and equally spaced side by side around the moving part of the actuator or moving end of the bellows.

In case the spring forces of the bellows and the centralizer mutually act in opposite directions, a balance point where the spring forces cancel each other may be found for the end of the bellows and where the end of the bellows rests if the current coil of the actuator has no electric current. This zero position of the end of the bellows lies in the path thereof, preferably near the middle or even precisely in the middle of said path, thus enabling the end of the bellows to move on both sides of this zero position depending on the direction of the electric current passing through the current coil. This arrangement is advantageous for instance in long serial dosing of a high number of successive liquid doses wherein the liquid space is filled with the liquid to be dosed and dosing is started from the extreme position of the end of the bellows to dose step by step successive liquid doses first by gradually decreasing the electric current passing through the current coil to reduce the magnetic attracting force of the actuator, and following the passing-by of the zero position, dosing is continued by reversing the direction of the electric current passing through the current coil and thus gradually increasing the magnetic repelling force of the actuator, until the serial dosing is completed as the end of the bellows reaches the opposite end of its movement path. Said zero position and the change of the direction of the electric current at that position enable the spring force acting against the actuator to remain as small as possible during the serial dosing. The lower the proportion of the attracting and repelling forces of the coil needed to surmount the action of the spring, the higher the force that may be used for the accelerations required in precise dosing of small amounts of liquids.

In a simple configuration of the device of the invention, the body of the device comprises a cylindrical jacket. The bellows and the moving part of the actuator connected thereto are sequentially arranged into the space defined by the jacket on the middle axis thereof. This arrangement enables the formation of the centralizer from springs, one end thereof being connected to the inner surface of the jacket and the other end being connected to the moving parts of the device.

In the device, the liquid space defined by the bellows may lie either within or without the bellows. The liquid space may be provided with a separate filling channel for the liquid to be dosed, the only task of the dosing tip thus being the discharging of the liquid doses. This helps to reduce the transfer movements required in dosing and promote the effective use of the dosing tip.

In the methods of the invention for quantitative dosing of small amounts of liquids, flexible bellows defining a liquid space containing the liquid to be dosed is moved by an actuator connected thereto to constrict the liquid space for discharging a liquid dose from a dosing tip communicating with the liquid space.

In the use according to the invention of the dosing device of the invention having an actuator formed of a magnet and a current coil co-operating therewith, one of said parts being connected to be stationary and the other moving the end of the bellows, dosing is carried out by changing the magnitude of the electric current passing through the coil, consequently shifting the magnet and the coil relative to each other to generate the dosing operation of the bellows. Dosing may be carried out by discharging directly into a liquid receiving the dosed amount, in this case the dosing tip being in contact with said receiving liquid, or the liquid may be dosed as droplets into the air.

Particularly for dosing droplets with the dosing tip, dosing according to the invention comprises the first step of setting the end of the bellows to an accelerated motion by changing the magnitude of the electric current passed to the actuator to give a specific initial acceleration to the liquid to be discharged from the dosing tip, followed by the second step of slowing down the motion of the end of the bellows by changing the magnitude of said electric current in the opposite direction to cause sharp separation of the liquid droplet from the dosing tip. Such a procedure may be carried out by using the actuator described above comprising a magnet and a current coil, or an equivalent actuator enabling the setting in accelerated motion or slowing down of the end of the bellows by adjusting the electric current passed to the actuator.

Dosing of droplets may for instance be carried out by initially passing to the current coil an electric current causing such a change of the magnetic field and thus, the volume of the bellows that a multiple of the desired liquid amount is produced. This causes a high acceleration pressing the liquid in the bellows and setting it in motion. In the beginning of the high-speed dosing movement, the elasticity of the flexible bellows causes the liquid to remain in the folds expanding under the high pressure acting thereon, thus defining the flow of the liquid to the dosing tip. The relaxing of the spring forces of the folds then causes the dosing movement to be continued until the slowing down due to the change of the direction of the electric current interrupts the movement and leaves the bellows to vibrate like a spring. This quick interruption of the movement causes the droplet to be separated sharply, at the velocity of 1 to 2 m/s according to the viscosity of the liquid, and allows for dosing of droplets having volumes many time smaller than the droplet size of a droplet allowed to be formed freely under capillary forces (about 40 µl for water). According to preliminary tests, the invention enables dosing of droplets with sizes between 10 nl and 40 µl, preferable droplet volumes being between 20 nl to 1 µl. So far, the quantitative dosing of individual liquid droplets having volumes in said ranges has not bee possible with any dosing means of prior art.

In applying the described droplet dosing to a serial dosing, the numerical value of the change of the electric current in the second step slowing down the bellows must be smaller than that of the change in the first step. It is further possible to draw some air into the dosing tip with the bellows before dosing of each individual liquid droplet to speed up the separation of the droplet.

According to the invention, in addition to a single dosing tip depending on the successive dosing operations of the bellows, also several parallel bellows provided with dosing tips carrying out dosing of matrix type by means of a common actuator moving the bellows may be used for serial dosing.

SUMMARY OF THE INVENTION

The invention relates to quantitative dosing of small amounts of liquids having a volume of microliter or nanoliter order. Such a dosing technique is useful for instance for productive serial dosing in applications of clinical chemistry. In dosing device of the invention, flexible bellows attached to a body define a liquid space filled with a liquid to be dosed and communicate with a dosing tip. The bellows are provided with an actuator for operation thereof, constricting the liquid space to cause a liquid dose to be discharged from the dosing tip. In the dosing device of the invention, the actuator is formed of a magnet and a current coil, one of the parts of the actuator being attached to the body of the device, and the other part being movably connected to the moving end of the bellows. The magnetic actuator generates the movements of the bellows by changing the magnitude of the electric current passing through the current coil. To linearize the movements of the end of the bellows, a centralizer formed of equally spaced helical springs may be arranged between the body and the moving parts of the dosing device. The invention is further directed to a dosing method based on movements of bellows moved by a magnetic actuator, and to a method wherein liquid is dosed as individual small droplets from the dosing tip by first accelerating and then by slowing down the motion of the bellows by means of the actuator. The invention may for instance be applied in the production of test strips used in chemical analyses.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
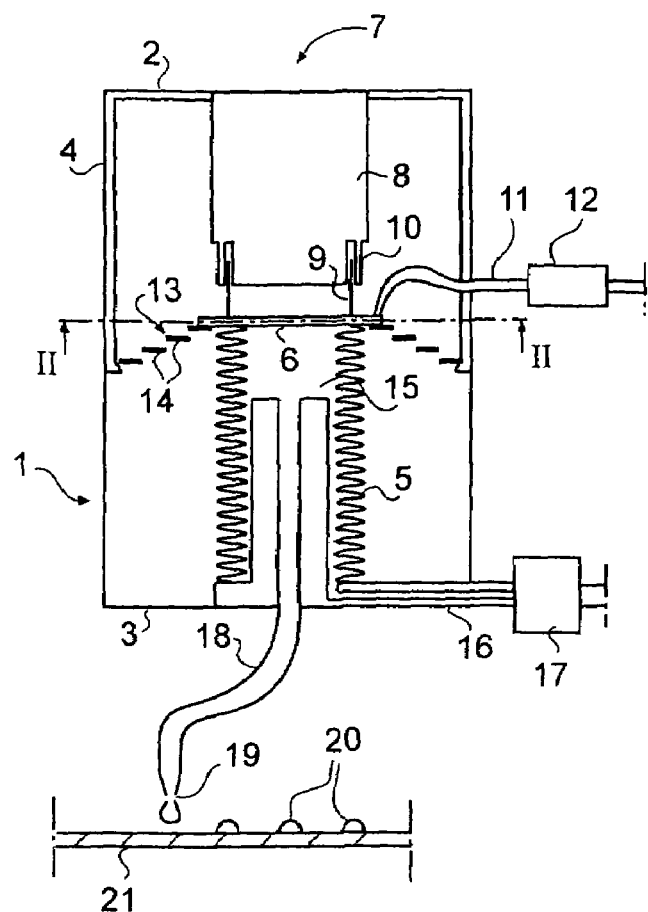
FIG. 1 shows a dosing device of the invention comprising bellows, a magnetic actuator and a dosing tip for dosing liquid onto a test strip.
Figure 2:
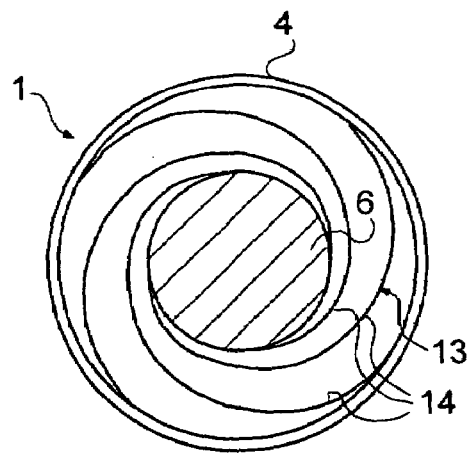
FIG. 2 shows the springs centralizing the end of the bellows as a cross section along line II-II in FIG. 1.

FIG. 1 shows a dosing device comprising a body 1 having a cover 2, a bottom 3 and a cylindrical jacket 4 therebetween. A flexible bellows 5 is adjusted on the axis of the space defined by the jacket 4, the bellows being for instance electrofabricated nickel/cobalt bellows or fiber reinforced plastic bellows. The lower end of the bellows 5 is attached to the bottom means 3 of the body, whereas the opposite end 6 thereof is arranged for linear movement in the axial directions of the bellows and the jacket 4 of the body. The end 6 of the bellows is moved by an actuator 7 formed of a permanent magnet 8 attached to the cover means 2 of the body, and an annular current coil 9 co-operating magnetically therewith. suitable current coils 9 include for instance commercially available acoustic coil actuators such as the products LA08-10 or LA13-12 manufactured by Bei Kimco Magnetics, USA. The current coil 9 is directly attached to the moving end 6 of the bellows and arranged to move in the axial direction of the jacket 4 in the annular groove 10 formed in the magnet 8 without contacting the magnet. Electric current may be passed to the current coil 9 through conductors 11, the magnitude of the current being adjusted with a digital-analog (DA) converter 12. According to the direction of the current, the coil and the magnet 8 either attract or repel each other. The DA converter may be a 16 bit converter having 64,000 different current values and being able to change the current value every 20 microseconds, or it may be a 20 or 24 bit converter having a still higher resolution. In the device, the current may be adjusted nearly continuously in the available adjusting range. To centralize the end of the bellows and the current coil 9 on the axis of the jacket 4 and to linearize the movements thereof, a centralizer 13 is adjusted between the jacket and the end of the bellows, the centralizer formed of three equally spaced helical springs 14 around the end of the bellows. Each of the springs 14 is thus attached at one end to the inner surface of the jacket 4 of the body and at the other end to the moving end 6 of the bellows 5. The springs 14 are plate springs, the width of the helical sheet being suitably tens of times the thickness thereof, thus giving the spring a high lateral rigidity while the spring yields freely in the axial direction. The sheet-like form of the springs 14 is seen in FIG. 1 showing the springs in cross sections. In the schematic FIG. 2, the springs 14 are shown as simple lines, but the helical form and position thereof around the end 6 of the bellows are best apparent in this Figure.

In the construction of the dosing device, the spring force of the bellows 5 and the helical springs 14 of the centralizer act against each other to balance the end 6 of the bellows at a position in case there is no electric current in the current coil 9. The end 6 of the bellows may thus move on both sides of the balance position according to the direction of the electric current passing through the coil 9. The end 6 of the bellows has a certain axial moving range, said balance point or a zero position preferably lying near the middle thereof.

A liquid space 15 filled with the liquid to be dosed is defined by the bellows 5, the dosing operation carried out by the device being based on the volume changes of said liquid space. The liquid space 15 has a filling channel 16 provided with a pump 17 also acting as a valve closing the space. A dosing channel 18 leads from the liquid space 15 to a dosing tip 19 discharging the dosed liquid amount 20. The device presented may be used for producing test strips for chemical analyses as shown in FIG. 1. Small liquid droplets 20 are injected on the strip from the dosing tip 19 as droplet dosing through the air. In a dosing tip 19 useful in droplet dosing, the inner diameter of the orifice discharging the droplets is most suitably between 0.2 and 0.5 mm.

The dosing device shown may be used in productive serial dosing wherein the liquid space 15 defined by the bellows 5 is filled with the liquid to be dosed, and thereafter, tens or even hundreds of small liquid doses having an equal volume are dosed by means of the actuator 7 constricting the liquid space 15 to cause the dosing operations. In the initial position, the magnet 8 and the current coil 9 attract each other against the total spring forces of the bellows 5 and the centralizer 13. Then, step by step, the magnitude of the current is lowered to decrease the attracting forces of the magnet 8 and the coil 9, the coil and the end 6 of the bellows withdrawing from the magnet, thus constructing the liquid space defined by the bellows in a stepwise manner. Each step corresponds to the discharging of a predetermined amount of liquid 20 from the dosing tip 19. The magnitude of the electric current in the coil 9 reaching the value of zero, said balance or zero position of the end 6 of the bellows is attained. From now on, the dosing is continued by reversing the direction of the electric current and by increasing the magnitude thereof step by step, the repelling force of the magnet 8 and the coil 9 thus pushing the end 6 of the bellows against the total spring forces of the bellows and the centralizer 13, constricting the liquid space 15 further. In this manner, the serial dosing is completed, the end 6 of the bellows having reached the end of its path. Then the coil 9 is returned to the initial position thereof by adjusting the current, and the liquid space 15 thus expanding to its initial volume is filled with liquid pumped from the filling channel 16 for the next serial dosing operation.

Figure 3:
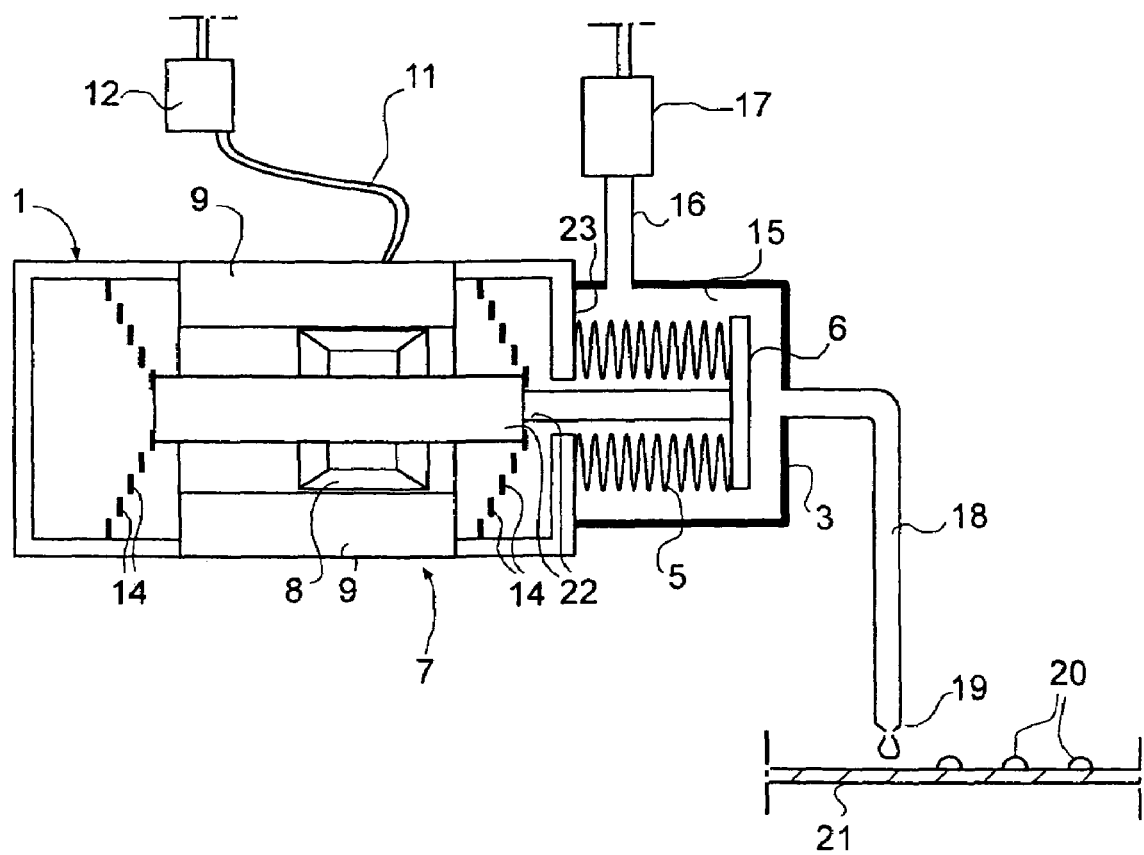
FIG. 3 shows another dosing device of the invention, in correspondence with FIG. 1.

The dosing device shown in FIG. 3 differs from the device of FIG. 1 substantially in that the liquid space 15 is arranged outside the bellows 5 and the permanent magnet as one part of the actuator is adjusted to slide. In addition, the device is shown in its preferable operational position having a horizontal axis of the reciprocating bellows. The cylindrical body 1 of the device is thus horizontal, the annular current coil 9 controlled by electric current being adjusted on the circumference of the body to be stationary. The permanent magnet 8 moved by current is adjusted inside the coil 9 without contacting it. The permanent magnet 8 is connected through a shaft 22 to the free end 6 of the bellows 5 for the movement thereof. On both sides of the permanent magnet 8, the shaft 22 is provided with helical springs 14 serving as centralizers between the shaft and the inner surface of the body 1. The liquid space 15 containing the liquid to be dosed is separated from the inner components of the device with a wall 23 having an opening for the shaft 22. The stationary end of the bellows 5 surrounding the shaft 22 is attached to said wall 23 to isolate the liquid space 15 outside the bellows from the rest of the inner parts of the device. dosing is carried out by moving the end 6 of the bellows 5 by means of the movement of the permanent magnet 8 to the right in FIG. 3 towards the end 3 of the device, thus constricting the liquid space 15 and a liquid volume corresponding to this constriction being discharged from the dosing channel 18 onto a test strip 21. With respect to all operations, the device according to FIG. 3 corresponds to that of FIG. 1.

EXAMPLE 1

The invention was tested with nickel/cobalt-bellows defining an inner liquid space with a cross section of 50 mm$^2$, the length of the path of the end of the bellows being 1.5 mm. The end of the bellows was moved with an acoustic coil LA08-10 producing an instantaneous compressing force of 0.9 kg, the coil being controlled by a 16 bit DA-converter using an Omega Engineering CIO-DAC02-16-controller card and the control program thereof. Effective dosing volume of the bellows is about 60 μl, and for said coil and DA converter, the smallest liquid volume that may be dosed is calculated to be about 1 nl. In the test, 20 doses of water having respectively a volume of 250 nl (250 μg), and 20 doses of water having respectively a volume of 15 nl (15 μg) were serially dosed directly into the receiving liquid having a volume of 2 ml, using liquid contact. Doses were determined by weighing the receiving liquid with a Mettler MT 5 balance before and after each dosing and by calculating the weight gain. It was found that the standard deviation of the 250 nl doses was 0.7 nl, and the standard deviation calculated for the 15 nl doses was 0.5 nl.

EXAMPLE 2

In the test, nickel/cobalt bellows having a diameter of 12.5 mm were used, the highest dosing volume corresponding to the length of the path of the end of the bellows being about 100 μl. The bellows were moved by an acoustic coil LA13-12 controlled by a DA converter of Example 1. The orifice of the dosing tip was 0.35 mm.

The liquid to be dosed was a thick, heterogenous liquid reagent containing solid particles having a 7-fold viscosity compared to water.

Dosing was carried out as droplet dosing using the technique described above, first accelerating and then slowing down the movement of the liquid for sharp release of the droplet from the dosing tip. 20 liquid doses having respectively a volume of 1.5 μl were serially dosed, each time starting dosing by changing the magnitude of the electric current passed through he coil by a value corresponding to a volume change of the dosing space of 6 μl. The repelling force of the coil was thus 4-fold compared to the force already producing a sufficient acceleration. About 8 ms after the start-up, the current in the coil was adjusted to a magnitude corresponding to a volume change of the dosing space of 1.5 μl to slow down the bellows, thus discharging the droplet with a velocity of 1.5 m/s. It was found that this procedure allowed dosing of liquid as 1.5 μl doses, the standard deviation being about 15 nl. The frequency of dosing was 5 doses per second.

EXAMPLE 3

Dilute dimethyl sulfoxide (DMSO) solution having a 2.5-fold viscosity compared to water was dosed with the dosing device of Example 2, using however smaller dosing tips. DMSO is a widely used solvent in drug research, dosing of which in small amounts has so far been difficult.

Using the droplet dosing technique of Example 2, 20 doses of the test solution, each having a volume of 250 nl, were serially dosed with a dosing tip having an orifice of 0.30 mm. The initial acceleration of the coil was over scaled 12-fold, the slowing down correction being carried out after 3 ms to the current magnitude corresponding with the dose volume. Doses were weighed with Mettler MT 5 balance, the standard deviation being 2 nl, that is less than 1% of the dose volume.

In the next serial dosing of 20 doses, the dose volume was 30 nl, and the orifice of the dosing tip was 0.24 mm, the procedure being otherwise the same as above. The standard deviation of the weighed doses was 3 nl, or 10% of the dose volume.

It is clear for those skilled in the art that the applications of the invention are not defined by the above examples, but may vary within the scope of the appended claims. For instance, while the dosing tip 19 of FIG. 1 is typically meant for dosing of droplets into the air, it may also be used for discharging the dose directly into another liquid. In the latter application, however, also various dosing channels or like flow connections passing from the bellows into a receptacle or a liquid space for the dose may be used. In this case, the dosing tip of the invention should be understood as an orifice of such a dosing channel or like flow connections discharging the liquid dose.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

The invention claimed is:

1. Dosing equipment for quantitative dosing of small amounts of liquids, comprising a body (1), a flexible bellows (5) attached to said body and defining a liquid space (15), a dosing tip (19) communicating with said liquid space, and an actuator (7) for moving said bellows so that constriction of said liquid space causes a dose to be discharged from said dosing tip, wherein said actuator (7) is formed of two parts (8, 9) moving relative to one another and acting magnetically on each other through an attracting or repelling force, one of the parts being attached to said body (1) of said dosing equipment and the other being connected to said bellows (5) to move it over a range of movement, said bellows acting with a spring force against said actuator, said actuator comprising one of two parts of a current coil (9) in cooperation with current adjusting means (12), said actuator working against said spring force of said bellows and generating movements of said bellows by changing magnitude of electric current passing through said coil, said current being adjustable with an adjusting range to permit selected dose volumes to be produced by said bellows movements of selected lengths within a range of movement.

2. The dosing equipment according to claim 1, wherein said actuator is formed of a permanent magnet (8) attached to said body (1) of said dosing equipment, and a current coil (9) adjusted to a movable end (6) of said bellows (5).

3. The dosing equipment according to claim 1, wherein said actuator is formed of a current coil (9) attached to said body (1) of said dosing equipment, and a permanent magnet (8) adjusted to the movable end (6) of said bellows (5).

4. The dosing equipment according to claim 1 wherein said dosing equipment is provided with a flexible centralizer (13) between said body (1) and the moving parts of said device to linearize the movements of an end (6) of said bellows.

5. The dosing equipment according to claim 4, wherein said flexible centralizer (13) is formed of three or more equally spaced parallel helical springs (14) surrounding the moving parts of said dosing equipment.

6. The dosing equipment according to claim 4 wherein spring forces of said centralizer (13) and said bellows (5) have a resultant balancing said end (6) of said bellows at a position, on both sides of which said end (6) may move depending on the direction of said electric current in said current coil.

7. The dosing equipment according to claim 5, wherein spring forces of said flexible centralizer (13) and said bellows (5) have a resultant balancing said end (6) of said bellows at a position, on both sides of which said end (6) may move depending on the direction of said electric current in said current coil.

8. The dosing equipment according to claim 6, wherein a balance position of said end (6) of said bellows lies in the middle of a linear path thereof.

9. The dosing equipment according to any of the preceding claims 1, 2, or 3, wherein said body (1) of said dosing equipment comprises a cylindrical jacket (4), said bellows (5) and the moving part of said actuator (7) being axially arranged in sequence in a space defined by said jacket.

10. The dosing equipment according to any of the preceding claims 1, 2, or 3, wherein said liquid space (15) defined by said bellows (5) is provided with a separate filling channel (16) for said liquid to be dosed.

11. Method for quantitative dosing of small amounts of liquids, wherein a flexible bellows (5) defining a liquid space (15) is moved by an actuator (7) connected thereto to constrict the liquid space for discharging a dose from the dosing tip (19) communicating with the liquid space, characterized in that the actuator (7) is formed of a magnet (8) and a current coil (9) co-operating therewith, one of said magnet or said current coil being stationarily installed and the other moving the bellows (5), said method for quantitative dosing being carried out by a step of changing the magnitude of the electric current passing through the coil, so that the resulting shifting of the magnet and the coil relative to each other generates a serial dosing carried out by means of repeated movements of said bellows (5) in one direction.

12. Method according to claim 11, characterized in that the dosing is carried out from the dosing tip (19) as droplets into the air.

13. Method according to claim 11, characterized in that the magnitude of the electric current passing through the coil (9) is changed to set the end (6) of the bellows to an accelerated motion, and thereafter, by changing the electric current a new but in the opposite direction, this second change being smaller than the first change, the motion of the end of the bellows is slowed down, thereby to give a specific initial acceleration to the liquid to be dosed from the dosing tip (19) in the first step, and to cause a sharp separation of the liquid droplet from the dosing tip by braking action in the second step.

14. Method according to claim 13, characterized in that the volume of the liquid droplet to be dosed is from 10 nl to 40 μl, preferably from 20 nl to 1 μl.

15. Method according to claim 11, characterized in that the dosing comprises a serial dosing carried out by means of repeated movements of the bellows (5) in one direction.

16. Method according to claim 15, characterized in that during the serial dosing, a flexible centralizer (14) acts on the end (6) of the bellows moved by the actuator (7) causing the resultant of the spring forces of the bellows and the centralizer to pass by a zero position at which the direction of the electric current passing through the coil (9) is reversed.

17. Method according to any of the preceding claims 11, 12, 13, or 14, characterized in that several parallel dosing bellows (5) are moved by the actuator (7) simultaneously to carry out a serial dosing of matrix type.

18. Method for quantitative dosing of small amounts of liquids, wherein a flexible bellows (5) defining a liquid space (15) is moved by an actuator (7) connected thereto to constrict the liquid space for discharging a dose from a dosing tip (19) communicating with the liquid space, characterized in that the dosing is carried out as dosing of droplets from the dosing tip (19) into the air by means of an actuator (7) driven by electric current comprising a first step of setting the end (6) of the bellows to an accelerated motion by changing the magnitude of the electric current passed to the actuator to give a specific initial acceleration to the liquid to be dosed from the dosing tip, followed by a second step of slowing down the motion of the end of the bellows by changing the magnitude of said electric current in the opposite direction to cause a sharp separation of a liquid droplet from the dosing tip.

19. Method according to claim 18, characterized in that the dosing comprises a serial dosing wherein change of the electric current in opposite direction in each second step is smaller than the preceding change in the respective first step.

20. Method according to claim 18 or 19, characterized in that the volume of the liquid droplet to be dosed is from 10 nl to 40 µl, preferably from 20 nl to 1 µl.

21. Dosing equipment for quantitative dosing of small amounts of liquids, comprising a body (1), a flexible bellows (5) attached to the body and defining a liquid space (15), a dosing tip (19) communicating with the liquid space, and an actuator (7) for moving said bellows so that constriction of said liquid space causes a dose to be discharged from said dosing tip, wherein said actuator is formed of two parts (8, 9) moving relative to one another and acting magnetically on each other, said two parts of said actuator being constituted by a current coil (9) and a magnet (8), said current coil being without contact with said magnet, one of said two parts being attached to said body of said device and the other being connected to said bellows to move it over a range of movement and said current coil generating movements of said bellows by changing the magnitude of an electric current passing through said coil, said current being adjustable within an adjusting range to let selected dose volumes be produced by said bellows movements of selected lengths within a range of movement.

\* \* \* \* \*